United States Patent [19]

Deutschmann et al.

[11] 4,400,945
[45] Aug. 30, 1983

[54] SUPERCHARGED RECIPROCATING INTERNAL COMBUSTION ENGINE

[75] Inventors: Herbert Deutschmann, Friedrichshafen; Georg Ruetz, Immenstaad, both of Fed. Rep. of Germany

[73] Assignee: MTU Motoren-Und Turbinen-Union Friechichshafen GmbH, Fed. Rep. of Germany

[21] Appl. No.: 176,206

[22] Filed: Aug. 7, 1980

[30] Foreign Application Priority Data

Feb. 15, 1980 [DE] Fed. Rep. of Germany ....... 3005655

[51] Int. Cl.³ .............................................. F02B 37/00
[52] U.S. Cl. ...................................... 60/612; 417/407
[58] Field of Search .................... 60/612; 123/198 E; 415/177, 178; 417/407

[56] References Cited

U.S. PATENT DOCUMENTS 4,032,262 6/1977 Zehnder ............................ 60/612 X 4,196,593 4/1980 Froeliger ............................... 60/612

FOREIGN PATENT DOCUMENTS 437078 10/1935 United Kingdom .................. 60/612
1220175 1/1971 United Kingdom ................ 417/407

Primary Examiner—Michael Koczo
Attorney, Agent, or Firm—Craig & Burns

[57] ABSTRACT

A reciprocating internal combustion engine with supercharging by several exhaust gas turbochargers. One or more housings are arranged on the internal combustion engine with the exhaust gas turbochargers being adapted to be mounted in the walls of such housing or housings in such a way that the turbines of the exhaust gas turbochargers and exhaust gas conduits are located in an interior of the housing or housings; whereas, the compressors of the exhaust gas turbochargers, as well as the supercharger air conduits with the supercharger air coolers are located exteriorly of the housing or housings.

34 Claims, 5 Drawing Figures

SUPERCHARGED RECIPROCATING INTERNAL COMBUSTION ENGINE

The present invention relates to an internal combustion engine and, more particularly, to a reciprocating piston-type internal combustion engine which includes a plurality of exhaust gas turbochargers for supercharging the engine.

With exhaust gas supercharged internal combustion engines, to improve supercharging conditions during a partial-load operation of the engine, it has been proposed to operate several exhaust gas turbochargers in parallel so as to produce a large quantity of exhaust gas and to shut off a portion of the turbochargers by blocking the exhaust gas produced. By virtue of such an arrangement, an entire exhaust gas of the internal combustion engine, during a partial-load operation, is supplied to the remaining exhaust gas turbochargers which can thereby, in turn, be operated in proximity to their optimum design and thus improve the degree of efficiency. Consequently, the superchargers can provide a higher supercharging pressure and a larger amount of air for supercharging. Due to the relatively large excess of air, the combustion process is improved, the fuel consumption is lowered, and a smoke-free operation is attained even in internal combustion engines designed for a high intermediate pressure.

The above-noted advantages obtained during a partial-load operation of an exhaust gas supercharged internal combustion engine are the more substantial with the higher number of exhaust gas turbochargers. Furthermore, the number of exhaust gas turbochargers is increased by a dual supercharging feature which has become somewhat popular in recent times.

As can readily be appreciated, the arrangement of several small exhaust gas turbochargers and associated exhaust gas, air feed and discharge lines in place of the customary one or two large exhaust gas turbochargers on an internal combustion engine can pose considerably great constructional difficulties.

The aim underlying the present invention essentially resides in providing an arrangement which enables the accommodation of a plurality of exhaust gas turbochargers on an internal combustion engine.

In accordance with advantageous features of the present invention, a reciprocating internal combustion engine is supercharged by several exhaust gas turbochargers and, for this purpose, one or more housings are arranged on the internal combustion engine with the exhaust gas turbochargers being adapted to be mounted in the interior of the housing or housings in such a way that the turbines of the exhaust gas turbochargers and the exhaust gas conduits are located in the interior of the housing; whereas, the compressors of the exhaust gas turbochargers as well as the supercharger air conduits with the supercharger air coolers are disposed outside of the housing or housings.

The housing or housings of the present invention provide the required installation possibilities for a secure mounting of the intended number of exhaust gas turbochargers on the engine. By the arrangement of the exhaust gas conveying parts in the interior of the housings and the air-conducting parts exterior of the housings, the corresponding conduits for the exhaust gas turbochargers may be maximally extensively combined. Consequently, the number of the necessary conduits may be lower in addition to such conduits being shorter thereby resulting in an assembly which is considerably simplified.

Moreover, by virtue of the above-noted features of the present invention, the hot elements such as the turbines and exhaust gas conduits are extensively separated with respect to a heat transfer from the supercharger air conduits which are to remain maximally cool, from the supercharger air coolers, and from the remaining parts of the internal combustion engine as well as being protected against undesired heat losses. Moreover, the provision of the housings represents a safety aspect for operating personnel since the provision of the housing considerably decreases the chances of unintentional contact by the operating personnel with the extremely hot exhaust-gas-conducting components.

In accordance with a further advantageous feature of the present invention, the housing or housings are constructed so as to be gas-tight and are provided with a thermal insulation. By virtue of these features, the exhaust gas conduit connections, which are normally difficult to seal, need not be entirely tight since any possibly escaping exhaust gas would be trapped inside the housing or housings. By virtue of the provision of insulation, the above-noted heat transfer and heat loss are additionally reduced.

Depending on the number and construction or design of the exhaust gas turbochargers in a one-stage or two-stage arrangement, advantageously in accordance with the present invention, several exhaust gas turbochargers may be mounted or disposed in one wall of the housing or housings.

With a two-stage supercharging, that is, with one low-pressure exhaust gas turbocharger driven by a low-pressure turbine and a high-pressure compressor driven by a high-pressure turbine, which are respectively connected in series, in accordance with yet further features of the present invention, an especially advantageous conduit arrangement for the exhaust gas lines is obtained if the respective two high-pressure exhaust gas turbochargers are mounted in a common wall of the housing and the associated low-pressure exhaust gas turbochargers are attached in the sidewalls adjacent to the common wall, and the supercharging groups are disposed axially symmetrically with respect to a horizontal axis.

In order to obtain a favorable division of space for the arrangement of turbochargers, according to the present invention, the housing is provided with four sidewalls with each of these sidewalls being provided with an exhaust gas turbocharger. Depending upon the size of the internal combustion engine and the number of cylinders, several housings can be arranged on the internal combustion engine thereby resulting in respective identical modules consisting of a housing and four exhaust gas turbochargers which may be preassembled with the conduits and merely maintained in storage for subsequent mounting on the engine.

With a two-stage supercharging arrangement, a favorable conduit system is also obtained in accordance with the present invention, if the two high-pressure exhaust gas turbochargers are arranged in two opposite housing walls and the two low-pressure exhaust gas turbochargers are disposed in the two other opposite housing walls.

In order to obtain identical exhaust gas turbochargers and conduit sections as well as an advantageous inlet flow and discharge flow conduit arrangement, in accordance with the present invention, the two supercharging groups consisting of a high-pressure exhaust gas turbocharger and a low-pressure exhaust gas turbocharger are disposed centrally symmetrically about a vertical axis.

With an exhaust gas turbine having a centripetal flow, the exhaust gas conduits between the high-pressure and low-pressure turbines may be eliminated in accordance with the present invention by arranging the axis of the high-pressure exhaust gas turbocharger perpendicularly to the axis of the associated low-pressure exhaust gas turbocharger, and by providing that a radial inlet nipple of the turbine of the low-pressure exhaust gas turbocharger directly adjoins an axial outlet nipple of the turbine of the associated high-pressure exhaust gas turbocharger.

In order to obtain advantageous conditions for a feeding of exhaust gases from an exhaust manifold into the housings or turbines, the housings may be placed on an intermediate housing which encompasses, in a gas-tight manner, the exhaust manifold. The exhaust manifold may be composed of several sections and extend in a longitudinal direction of the internal combustion engine, with the formation of an inner space, and exhibit perforations on a topside connected to the exhaust manifold and to which vertical pipe nipples may be attached in a gas-tight fashion, which pipe nipples extend into the housings and lead by way of a plug-in connection into the inlet nipples of the turbines.

To avoid a consequential pressure loss, it is merely necessary to construct the intermediate housing for the leakage losses from the exhaust manifold and thus for a high pressure upstream of the turbines. In contrast to the intermediate housing, the actual housings for accommodating the exhaust gas turbochargers, may be designed for a pressure downstream of the superchargers since the conduit between the pipe nipple and the inlet nipple can be well sealed without incurring any excessive expenditures.

In order to enable the cutoff of the exhaust gas turbochargers during a partial-load operation, advantageously the flaps or valves for blocking off the exhaust gas may be arranged in the pipe nipples with the flaps being readily accessible after a removal of the housings or after a disassembly of the associated exhaust gas turbocharger.

The heat flow from the exhaust manifold to the remaining parts of the engine may be lessened in accordance with the present invention by constructing the intermediate housing so as to have spaced double walls with the engine coolant traversing the space between the double walls.

In order to facilitate assembly and disassembly of the exhaust gas turbochargers and conduits, advantageously each housing is divided horizontally with the axes of the exhaust gas turbochargers being arranged horizontally and with the exhaust gas turbochargers being mounted in a plane of division of the housings in semicircular recesses provided at the top and bottom sections of the housing.

In order to enable a converging of the exhaust gases exiting from the turbines without any additional assembly work, according to the present invention, an upwardly extending exhaust gas nipple common to all the turbines may be disposed or attached in the top section of the housing, with the inlet openings of the common nipple being placed, during assembly of the top section, transversely in front of the exhaust gas outlet of the respective turbines.

Accordingly, it is an object of the present invention to provide a construction which enables the arrangement of several small exhaust gas turbochargers on a supercharged internal combustion engine, which avoids by simple means shortcomings and disadvantages encountered in the prior art.

Another object of the present invention resides in providing a construction for enabling the accommodation of several small exhaust gas turbochargers which ensures an advantageous arrangement and dimension of the exhaust gas and air conduits in order to attain an efficient mode of operation of the entire system and the assembled construction.

A further object of the present invention resides in providing a reciprocating internal combustion engine supercharged by several exhaust gas turbochargers which functions reliably under all operating conditions.

A still further object of the present invention resides in providing a reciprocating internal combustion engine which is supercharged by several exhaust gas turbochargers which reduces the number and length of the conduits and simplifies the mounting of the several exhaust gas turbochargers on the engine.

A still further object of the present invention resides in providing a reciprocating internal combustion engine supercharged by several exhaust gas turbochargers which minimizes the heat transfer and heat loss.

Yet another object of the present invention resides in providing a reciprocating internal combustion engine supercharged by several exhaust gas turbochargers wherein assembly and disassembly of the exhaust gas turbochargers may be effected in an extremely simple manner.

These and other objects, features, and advantages of the present invention will become more apparent from the following description when taken in connection with the accompanying drawings which show, for the purposes of illustration only, several embodiments in accordance with the present invention, and wherein.

Figure 1:
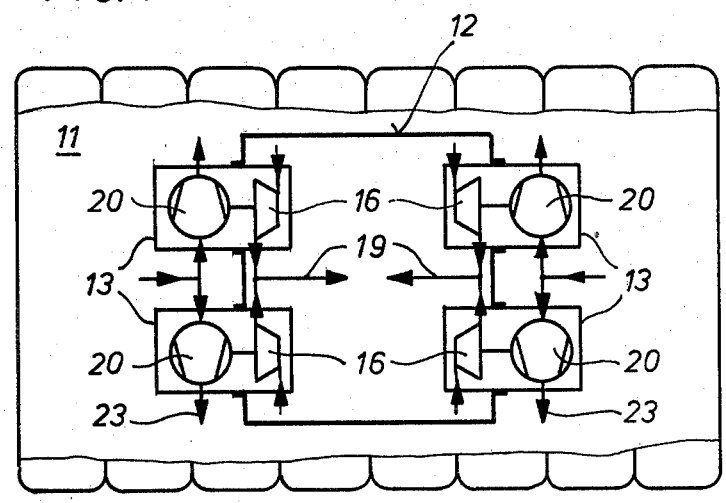
FIG. 1 is a schematic top view of a housing for accommodating four single-stage exhaust gas turbochargers on an internal combustion engine in accordance with the present invention.

Referring now to the drawings wherein like reference numerals are used throughout the various views to designate like parts and, more particularly, to FIG. 1, according to this figure, a housing 12, disposed on an engine 11, is provided for accommodating in an interior thereof four single-stage exhaust gas turbochargers 13. Each single-stage exhaust gas turbocharger includes a turbine 16, a compressor 20, supercharged air conduits 23, as well as exhaust gas conduits 19.

Figure 2:
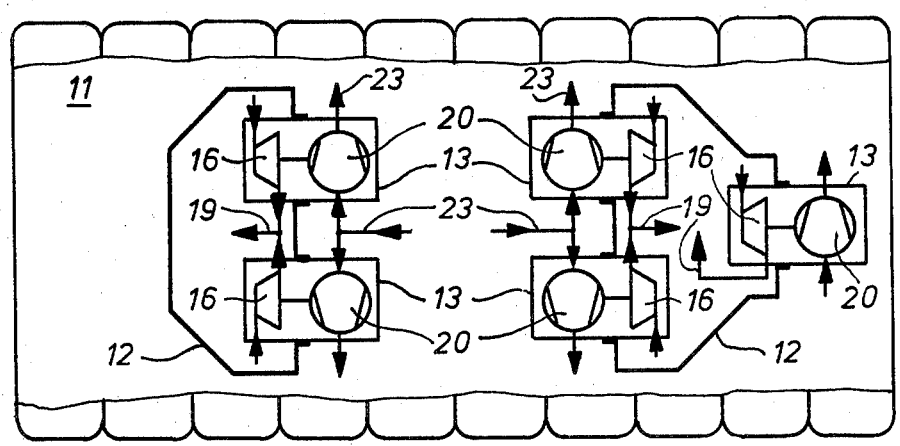
FIG. 2 is a top schematic view of two different housings for respectively accommodating two and three single-stage exhaust gas turbochargers on an internal combustion engine in accordance with the present invention.

As shown in FIG. 2, two housings 12 are disposed on the engine 11 with one of the housings accommodating two one-stage exhaust gas turbochargers 13 and the other housing 12 accommodating three one-stage exhaust gas turbochargers 13. As with the arrangement of FIG. 1, each of the one-stage exhaust gas turbochargers 13 in FIG. 2 includes a turbine 16, a compressor 20, supercharged air conduits 23, as well as exhaust gas conduits 19.

Figure 3:
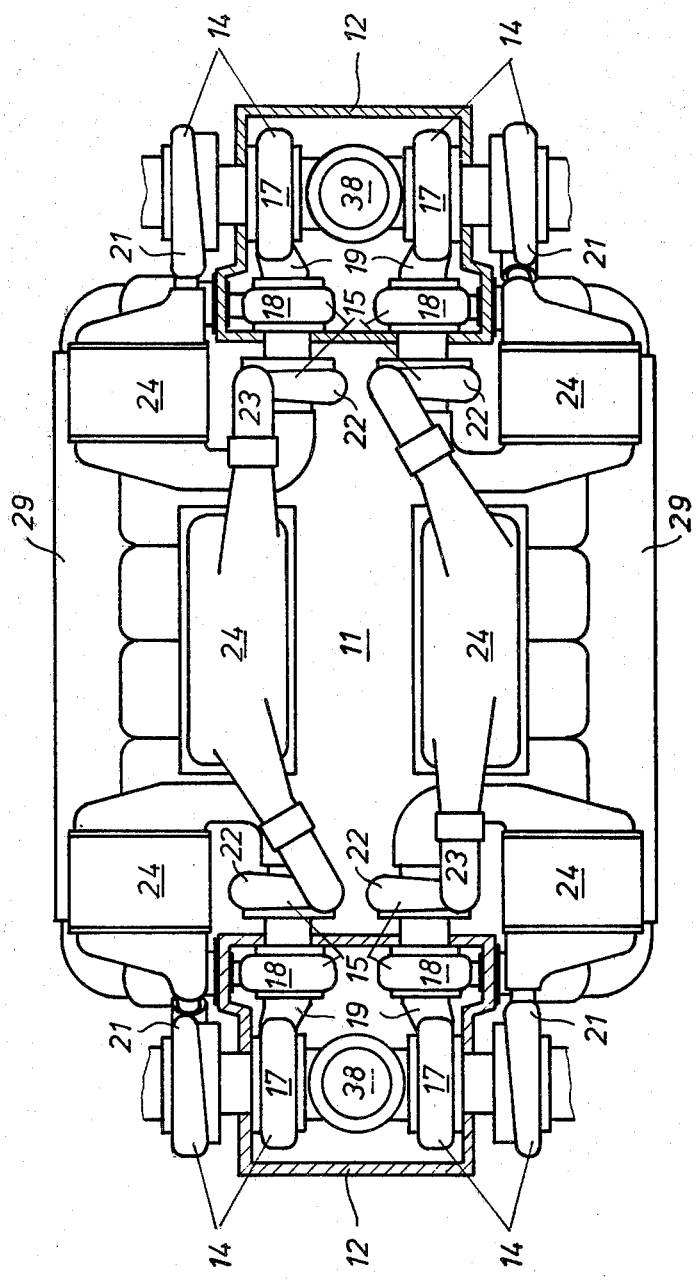
FIG. 3 is a top view of an internal combustion engine having two identical housings disposed thereon for respectively accommodating two high and two low pressure exhaust gas turbochargers in accordance with the present invention.
Figure 5:
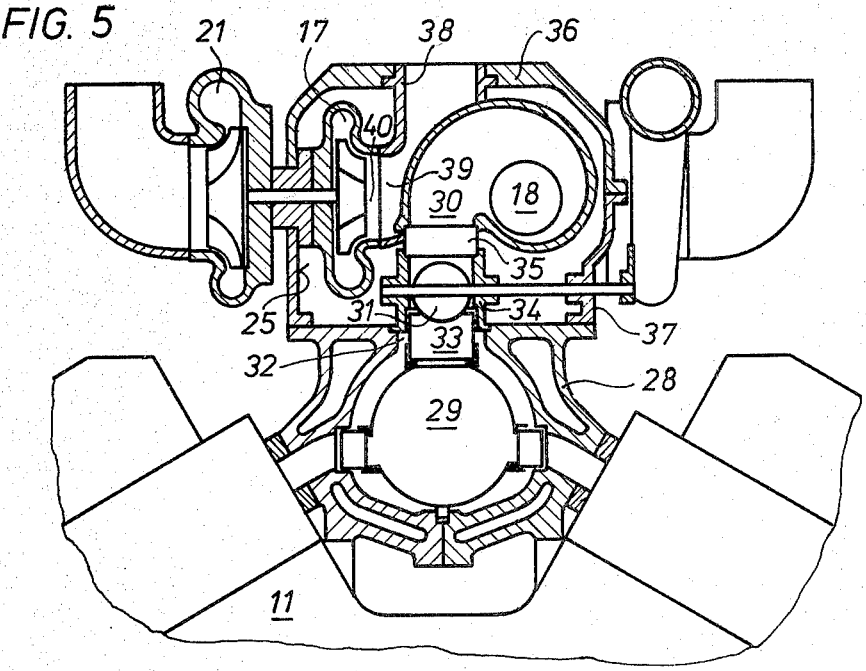
FIG. 5 is a vertical partial cross-sectional view taken along the line V—V in FIG. 4.
Figure 4:
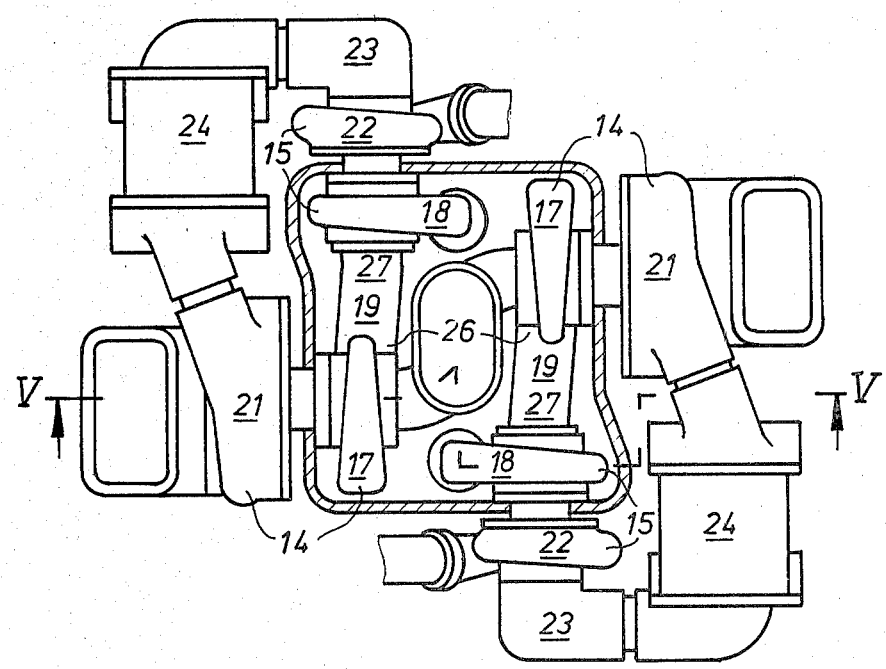
FIG. 4 is an enlarged top detailed view of a housing construction in accordance with the present invention for accommodating two high and two low pressure exhaust gas turbochargers.

While FIGS. 1 and 2 depict the arrangement of one or several housings with one-stage exhaust gas turbochargers 13 in a purely schematic fashion, FIGS. 3–5 provide an indication of more details regarding the construction of the housing and the arrangement of multi-stage exhaust gas turbochargers on the engine 11.

As shown in FIG. 3, two high-pressure exhaust gas turbochargers 15 are respectively disposed in a common wall of each housing 12 and the respectively associated low-pressure exhaust gas turbochargers 14 are mounted in sidewalls adjacent the common wall of the housing 12. The supercharger groups formed from the high-pressure exhaust gas turbochargers 15 and low-pressure exhaust gas turbochargers 14 are located axially symmetrically with respect to a horizontal line, with the axes of the high-pressure exhaust gas turbochargers 15 extending perpendicular to the axes of the associated low-pressure exhaust gas turbochargers 14, and a radial inlet nipple of low-pressure turbines 17 of the respective low-pressure exhaust gas turbochargers 14 directly adjoining an axial outlet nipple of high-pressure turbines 18 of the associated high-pressure exhaust gas turbochargers 15. Two exhaust gas manifolds 29 extend in a longitudinal direction of the internal combustion engine 11 and are each connected to the high-pressure turbines 18. Compressor 22 is connected to compressor 21 via conduit 23 and supercharger air cooler 24. Exhaust gases exiting from the low-pressure turbines 17 are removed through an exhaust gas nipple 38.

FIGS. 4 and 5 provide an illustrated example of a gas-tight construction of the housings of the present invention with the housings being provided with thermal insulation 25. As shown in these figures, the housing is provided with four sidewalls. Two high-pressure exhaust gas turbochargers 15 are mounted in two opposite housing walls with the two low-pressure exhaust gas turbochargers 14 being mounted in the two other opposed housing walls. Thus, supercharger groups are formed each consisting of a high-pressure exhaust gas turbocharger 15 and a low-pressure exhaust gas turbocharger 14 with the supercharger groups being disposed centrically symmetrically about a vertical axis.

As shown most clearly in FIG. 4, the axes of the respective high-pressure exhaust gas turbochargers 15 are perpendicular to the axes of the low-pressure exhaust gas turbochargers 14 and the radial inlet nipple 26 of the low-pressure turbine 17 connected to compressor 21 directly adjoins an axial outlet nipple 27 of an associated high-pressure turbine 18 connected to compressor 22. Compressor 22 is connected to compressor 21 via conduit 23 and supercharger air cooler 24

As shown most clearly in FIG. 5, the housing may be placed or mounted on an intermediate housing 28 provided with a double wall jacket which is adapted to be traversed by the coolant or cooling water of the engine 11. The intermediate housing 28 surrounds, in a gas-tight manner, the exhaust gas manifold 29 which may consist of several sections and extend in a longitudinal direction of the engine 11. The intermediate housing 28 is provided with perforations 32 on a topside thereof which perforations 32 are in communication, through pipes 33, with the exhaust gas manifold 29. Vertically extending pipe nipples 34 are attached or secured onto the perforations 32, with the pipe nipples 34 extending into the housing 12 and leading, through plug-in connections 35, into the inlet nipples 30 of the high-pressure turbines 18. Flaps or valves 31 are disposed in the pipe nipples 34 and are adapted to selectively block off the exhaust gases from flowing into the high-pressure turbines 18.

The housing 12 is horizontally divided into a top section 36 and a bottom section 37 and axes of the high-pressure exhaust gas turbochargers 15 and low-pressure exhaust gas turbochargers 14 are arranged horizontally, with the exhaust gas turbochargers being mounted in the dividing plane of the housing 12 in semicircular recesses provided at the top and bottom sections 36, 37 of the housing 12. An exhaust gas nipple 38 is attached or secured in the top section 36. The exhaust gas nipple 38 is common to the low-pressure turbines 17 and extends in an upward direction. Inlet openings 39 of the exhaust gas nipple 38 are, during assembly of the top section 36, placed transversely in front of the exhaust gas outlets 40 of the low-pressure turbines 17.

While we have shown and described several embodiments in accordance with the present invention, it is understood that the same is not limited thereto but is susceptible of numerous changes and modifications as known to one having ordinary skill in the art, and we therefore do not wish to be limited to the details shown and described herein, but intend to cover all such modifications as are encompassed by the scope of the appended claims.

We claim:

1. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, characterized in that at least one housing means if provided for accommodating said plurality of turbocharger means, each of said turbocharger means is adapted to be mounted in a wall of the housing means in such a manner that the turbine means and exhaust gas conduit means are located in an interior of the housing means, exhaust gas conduit means of plural turbocharger means being joined to a common exhaust gas channel within said housing, and the compressor means and air conduit means are located exteriorly of the housing means.

2. A reciprocating internal combustion engine according to claim 1, with supercharger air cooler means, characterized in that the supercharger air cooler means are disposed exteriorly of the housing means.

3. A reciprocating internal combustion engine according to claim 2, characterized in that the at least one housing means is constructed so as to be gas-tight, and in that means are provided for thermally insulating said housing means.

4. A reciprocating internal combustion engine according to one of claims 1 or 3, characterized in that means are provided for enabling an attachement of the plurality of exhaust gas turbocharger means in a wall of the housing means.

5. A reciprocating internal combustion engine according to one of claims 1 or 3, characterized in that each of the plurality of exhaust gas turbocharger means is constructed as a single-stage exhaust gas turbocharger.

6. A reciprocating internal combustion engine according to claim 5, characterized in that at least four single-stage exhaust gas turbochargers are accommodated in the at least one housing means.

7. A reciprocating internal combustion engine according to one of claims 1 or 3, characterized in that at least two housing means are provided, at least two exhaust gas turbocharger means are accommodated in one of said housing means, and at least three exhaust gas turbocharger means are accommodated in the second of the at least two housing means.

8. A reciprocating internal combustion engine according to claim 7, characterized in that each of said exhaust gas turbocharger means is constructed as a single-stage exhaust gas turbocharger.

9. A reciprocating internal combustion engine according to one of claims 1 or 3, characterized in that each exhaust gas turbocharger means provides for a two-stage supercharging and includes a high-pressure exhaust gas turbocharger and a low-pressure exhaust gas turbocharger associated with said high-pressure exhaust gas turbocharger, said high-pressure exhaust gas turbocharger and associated low-pressure exhaust gas turbocharger forming a supercharger group, and in that two supercharger groups are accommodated in said housing means and are arranged axially symmetrically with respect to a horizontal axis extending through the housing means.

10. A reciprocating internal combustion engine according to claim 9, characterized in that the high-pressure exhaust gas turbocharger of each of the supercharger groups is mounted in a common wall of the housing means, and in that the low-pressure exhaust gas turbocharger of each of the supercharger groups is mounted in opposed sidewalls of the housing means adjacent the common wall.

11. A reciprocating internal combustion engine according to claim 10, characterized in that at least two housing means are provided, each of said housing means accommodating at least two supercharger groups.

12. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, characterized in that
the at least one housing means includes four sidewalls, and in that an exhaust gas turbocharger means is mounted in each of the sidewalls.

13. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, characterized in that
each exhaust gas turbocharger means provides for a two-stage supercharging and includes a high-pressure exhaust gas turbocharger and a low-pressure exhaust gas turbocharger associated with said high-pressure exhaust gas turbocharger, and in that a high-pressure exhaust gas turbocharger is mounted in each of two oppositely disposed sidewalls of the housing means and a low-pressure exhaust gas turbocharger is mounted in the other two oppositely disposed sidewalls of the housing means.

14. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means,
supercharger air cooler means disposed exteriorly of the housing means,
the at least one housing means is constructed so as to be gas-tight, means are provided for thermally insulating said housing means, characterized in that
each exhaust gas turbocharger means provides for a two-stage supercharging and includes a high-pressure exhaust gas turbocharger and a low-pressure exhaust gas turbocharger associated with said high-pressure exhaust gas turbocharger, and in that a high-pressure exhaust gas turbocharger is mounted in each of two oppositely disposed sidewalls of the housing means and a low-pressure exhaust gas turbocharger is mounted in the other two oppositely disposed sidewalls of the housing means.

15. A reciprocating internal combustion engine according to one of claims 13 and 14, characterized in that a high-pressure exhaust gas turbocharger and an associated low-pressure exhaust gas turbocharger form a supercharger group, and in that two supercharger groups are arranged centrally symmetrically about a vertical axis extending through the housing means.

16. A reciprocating internal combustion engine according to claim 15, wherein the exhaust gas turbine means are centripetal exhaust gas turbines, characterized in that a central axis of the high-pressure exhaust gas turbocharger of each supercharger group extends perpendicular to a central axis of an associated low-pressure exhaust gas turbocharger, and in that a radial inlet nipple of an exhaust gas turbine means of a low-pressure exhaust gas turbocharger directly adjoins an axial outlet nipple of an exhaust gas turbine of an associated high-pressure exhaust gas turbocharger.

17. A reciprocating internal combustion engine according to claim 16, wherein the engine includes at least one longitudinally extending multi-sectional exhaust gas manifold means, characterized in that an intermediate housing means is provided for mounting said at least one housing means on the engine, said intermediate housing means gas-tightly encompasses the exhaust gas manifold means of the engine in such a manner so as to form a space between the manifold means and walls of the intermediate housing means, a plurality of perforations are provided in a topside of the intermediate housing means for communicating the same with the manifold means, vertically extending pipe nipple means are gas-tightly attached in each of the perforations and extends into the at least one housing means, and in the plug-in connection means are provided for connecting the pipe nipple means into inlet nipple means of the exhaust gas turbine means of the high-pressure exhaust gas turbochargers.

18. A reciprocating internal combustion engine according to claim 17, characterized in that valve means are arranged in each of the pipe nipple means for enabling a selective blocking of a flow of the exhaust gases into the exhaust gas turbine means of the high-pressure exhaust gas turbocharger.

19. A reciprocating internal combustion engine according to claim 18, characterized in that the intermediate housing means is of a double-wall construction with a cooling medium jacket being defined between the double walls so as to enable a flow of engine coolant through the intermediate housing means.

20. A reciprocating internal combustion engine according to claim 19, characterized in that at least two housing means are provided and an intermediate housing means is provided for mounting the respective housing means on the engine, and in that at least two supercharger groups are accommodated in each of the at least two housing means.

21. A reciprocating internal combustion engine according to claim 20, characterized in that each of the at least two housing means are horizontally divided into a top section and a bottom section along a dividing plane, and in that the central axis of the respective high-pressure exhaust gas turbochargers and low-pressure exhaust gas turbochargers are horizontally disposed, and in that semicircular recess means are provided in the top section and bottom section of the respective housing means for enabling a mounting of the exhaust gas turbochargers in the dividing plane of the respective housing means.

22. A reciprocating internal combustion engine according to claim 21, characterized in that an exhaust gas nipple means common to all of the exhaust gas turbine means of the low-pressure exhaust gas turbochargers in the respective housing means is attached to the top section of the housing means, and in that inlet openings of the exhaust gas nipple means are arranged so that they are respectively disposed transversely in front of exhaust gas outlets of the exhaust gas turbine means of the low-pressure exhaust gas turbocharger means during assembly of the top section of the respective housing means.

23. A reciprocating internal combustion engine according to one of claims 13 or 14, wherein the engine includes at least one longitudinally extending multi-sectional exhaust gas manifold means, characterized in that an intermediate housing means is provided for mounting said at least one housing means on the engine, said intermediate housing means gas-tightly encompasses the exhaust gas manifold means of the engine in such a manner so as to form a space between the manifold means and walls of the intermediate housing means, a plurality of perforations are provided in a topside of the intermediate housing means for communicating the same with the manifold means, vertically extending pipe nipple means are gas-tightly attached in each of the perforations and extends into the at least one housing means, and in that plug-in connection means are provided for connecting the pipe nipple means into inlet nipple means of the exhaust gas turbine means of the high-pressure exhaust gas turbochargers.

24. A reciprocating internal combustion engine according to claim 23, characterized in that valve means are arranged in each of the pipe nipple means for enabling a selective blocking of a flow of the exhaust gases into the exhaust gas turbine means of the high-pressure exhaust gas turbocharger.

25. A reciprocating internal combustion engine according to claim 24, characterized in that the intermediate housing means is of a double-wall construction with a cooling medium jacket being defined between the double walls so as to enable a flow of engine coolant through the intermediate housing means.

26. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, characterized in that
   said at least one housing means is horizontally divided into a top section and a bottom section along a dividing plane, and in that means are provided in the top section and bottom section for enabling a mounting of the exhaust gas turbocharger means in the dividing plane of the at least one housing means.

27. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, supercharger air cooler means disposed exteriorly of the housing means, the at least one houing means is constructed so as to be gas-tight, means are provided for thermally insulating said housing means, and characterized in that said at least one housing means is horizontally divided into a top section and a bottom section along a dividing plane, and in that means are provided in the top section and bottom section for enabling a mounting of the exhaust gas turbocharger means in the dividing plane of the at least one housing means.

28. A reciprocating internal combustion engine according to one of claims 26 and 27, characterized in that an exhaust gas nipple means common to all of the exhaust gas turbine means of the exhaust gas turbocharger means in the at least one housing means is attached to the top section of the housing means, and in that inlet openings of the exhaust gas nipple means are arranged so that they are respectively disposed transversely in front of exhaust gas outlets of the exhaust gas turbine means during assembly of the top section of the respective housing means.

29. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, wherein the engine includes at least one longitudinally extending multi-sectional exhaust gas manifold means, characterized in that an intermediate housing means is provided for mounting said at least one housing means on the engine, said intermediate housing means gas-tightly encompasses the exhaust gas manifold means of the engine in such a manner so as to form a space between the manifold means and walls of the intermediate housing means, a plurality of perforations are provided in a topside of the intermediate housing means for communicating the same with the manifold means, vertically extending pipe nipple means are gas-tightly attached in each of the perforations and extends into the at least one housing means, and in that plug-in connection means are provided for connecting the pipe nipple means into inlet nipple means of the exhaust gas turbine means of the exhaust gas turbocharger means.

30. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, supercharger air cooler means disposed exteriorly of the housing means, the at least one housing means is constructed so as to be gas-tight, means are provided for thermally insulating said housing means, wherein the engine includes at least one longitudinally extending multi-sectional exhaust gas manifold means, characterized in that an intermediate housing means is provided for mounting said at least one housing means on the engine, said intermediate housing means gas-tightly encompasses the exhaust gas manifold means of the engine in such a manner so as to form a space between the manifold means and wall of the intermediate housing means, a plurality of perforations are provided in a topside of the intermediate housing means for communicating the same with the manifold means, vertically extending pipe nipple means are gas-tightly attached in each of the perforations and extends into the at least one housing means, and in that plug-in connection means are provided for connecting the pipe nipple means into inlet nipple means of the exhaust gas turbine means of the exhaust gas turbocharger means.

31. A reciprocating internal combustion engine according to one of claims 24 or 30, characterized in that valve means are arranged in each of the pipe nipple means for enabling a selective blocking of a flow of exhaust gases into the exhaust gas turbine means of the exhaust gas turbocharger means.

32. A reciprocating internal combustion engine according to claim 31, characterized in that the intermediate housing means is of a double-wall construction with a cooling medium jacket being defined between the double walls so as to enable a flow of engine coolant through the intermediate housing means.

33. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, supercharger air cooler means disposed exteriorly of the housing means, and the at least one housing means is constructed so as to be gas-tight, means are provided for thermally insulating said housing means, and characterized in that the at least one housing means includes for sidewalls, and in that an exhaust gas turbocharger means is mounted in each of the sidewalls.

34. A reciprocating internal combustion engine which includes a plurality of exhaust gas turbocharger means for supercharging the engine, each exhaust gas turbocharger means including exhaust gas turbine means, exhaust gas conduit means, compressor means, and air conduit means for supplying supercharged air to the engine, at least one housing means is provided for accommodating said plurality of turbocharger means, each of said turbocharger means is adapted to be mounted in a wall of the housing means in such a manner that the turbine means and exhaust gas conduit means are located in an interior of the housing means and the compressor means and air conduit means are located exteriorly of the housing means, each exhaust gas turbocharger means provides for a two-stage supercharging and includes a high-pressure exhaust gas turbocharger and a low-pressure exhaust gas turbocharger associated with said high-pressure exhaust gas turbocharger, said high-pressure exhaust gas turbocharger and associated low-pressure exhaust gas turbocharger forming a supercharger group, and two supercharger groups are accommodated in said housing means, the at least one housing means includes four sidewalls, the high-pressure exhaust gas turbocharger of each supercharger group is mounted in a first sidewall and the low pressure exhaust gas turbocharger of said each supercharger group is mounted in a second sidewall.

* * * * *